United States Patent [19]

Fey

[11] Patent Number: 4,634,857

[45] Date of Patent: Jan. 6, 1987

[54] IMAGING ARRANGEMENT FOR SCANNING USING STATIONARY OPTICS

[75] Inventor: Hans-Jürgen Fey, Aalen, Fed. Rep. of Germany

[73] Assignee: Carl-Zeiss-Stiftung, Heidenheim, Fed. Rep. of Germany

[21] Appl. No.: 574,679

[22] Filed: Jan. 27, 1984

[30] Foreign Application Priority Data

Jan. 28, 1983 [DE] Fed. Rep. of Germany ....... 3302800

[51] Int. Cl.⁴ .............................................. H01J 5/16
[52] U.S. Cl. ..................................... 250/227; 250/578
[58] Field of Search .............. 250/234, 235, 236, 216, 250/227, 578; 350/96.1, 96.15, 96.16, 6.5; 358/292, 293

[56] References Cited

U.S. PATENT DOCUMENTS

| | | | |
|---|---|---|---|
| 3,213,179 | 10/1965 | Clauson | 250/227 |
| 4,010,364 | 3/1977 | Fuwa | 358/292 |
| 4,113,353 | 9/1978 | Matsushita | 250/227 |
| 4,256,959 | 3/1981 | Monette | 250/235 |
| 4,514,626 | 4/1985 | Tateoka et al. | 250/235 |

*Primary Examiner*—David C. Nelms
*Attorney, Agent, or Firm*—Walter Ottesen

[57] ABSTRACT

The invention is directed to arrangement wherein an object is scanned by a columnar light spot traveling in a first coordinate direction (x). The light scattered or transmitted from the object is directed to a linear detector whose individual, sequentially scanned elements effect the resolution of the object in the second coordinate direction (y). The object is scanned via a first layer of mutually adjacent light-conductive fibers which are placed directly on the object. A second layer of fibers overlaps the first layer in crosswise fashion and directs the scattered light toward the detector. In the region where the fiber layers overlap, the cores of the fibers are exposed on the side thereof facing the object and are covered with diffraction gratings to couple the light into and out of the fiber cores.

13 Claims, 9 Drawing Figures

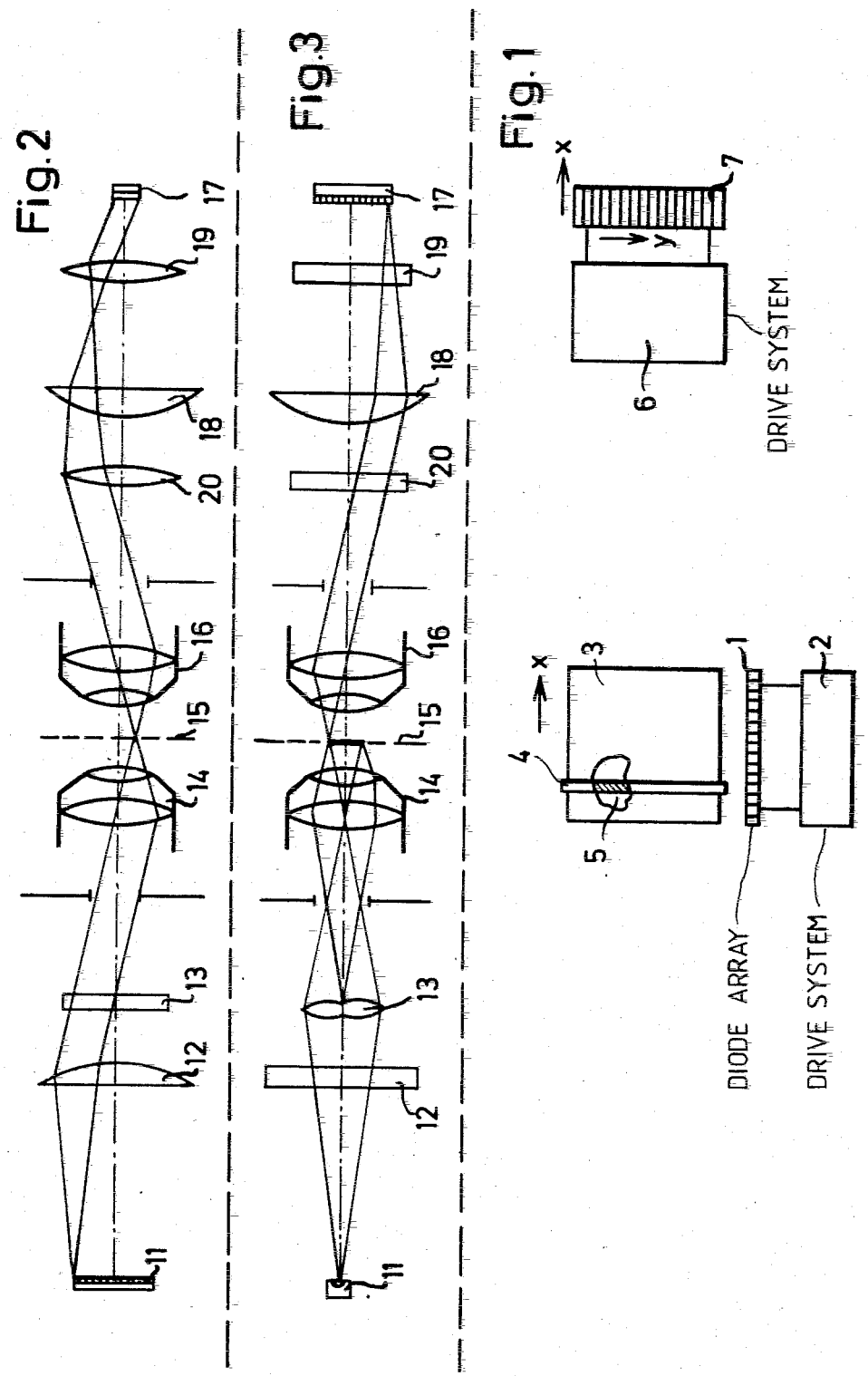

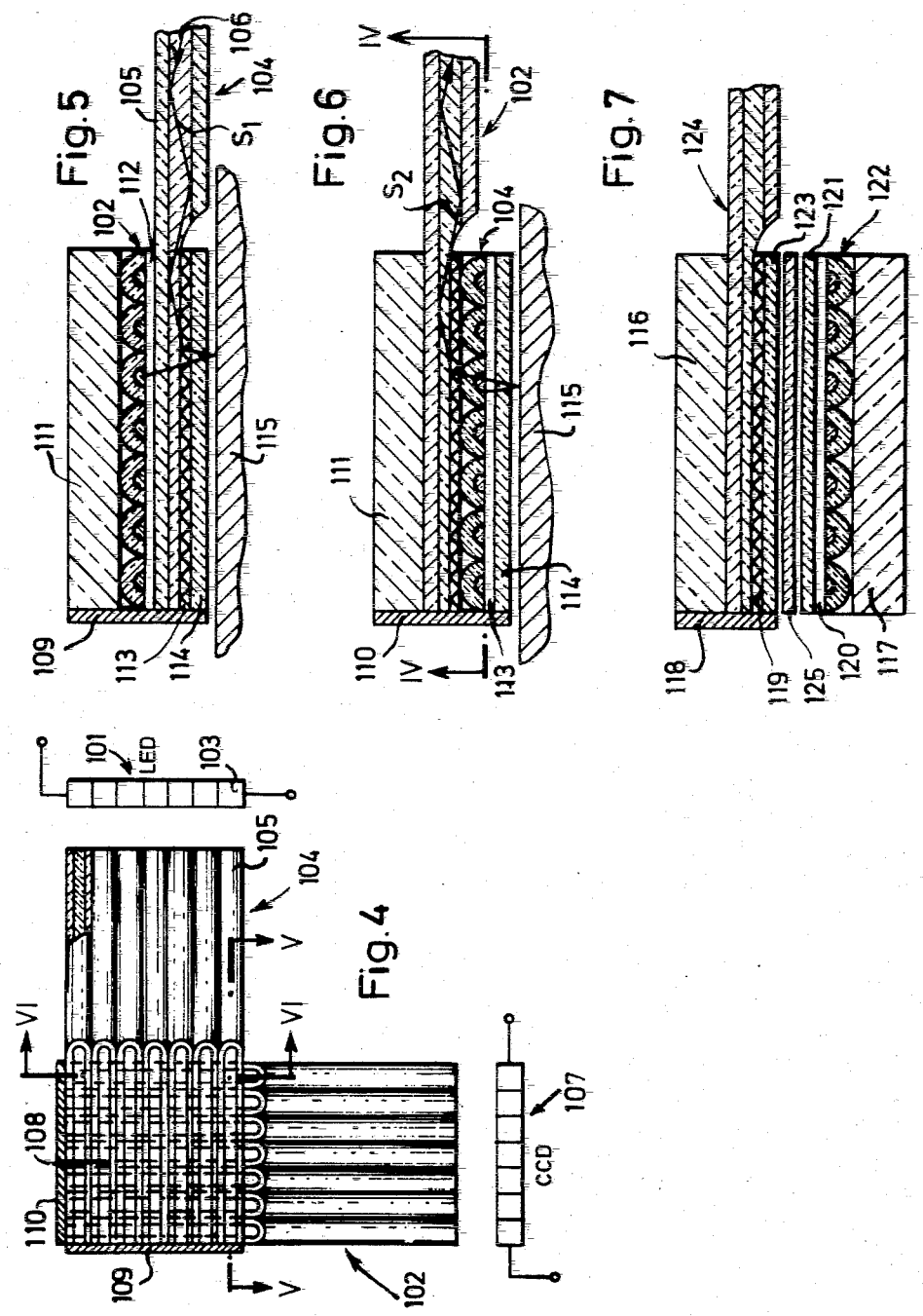

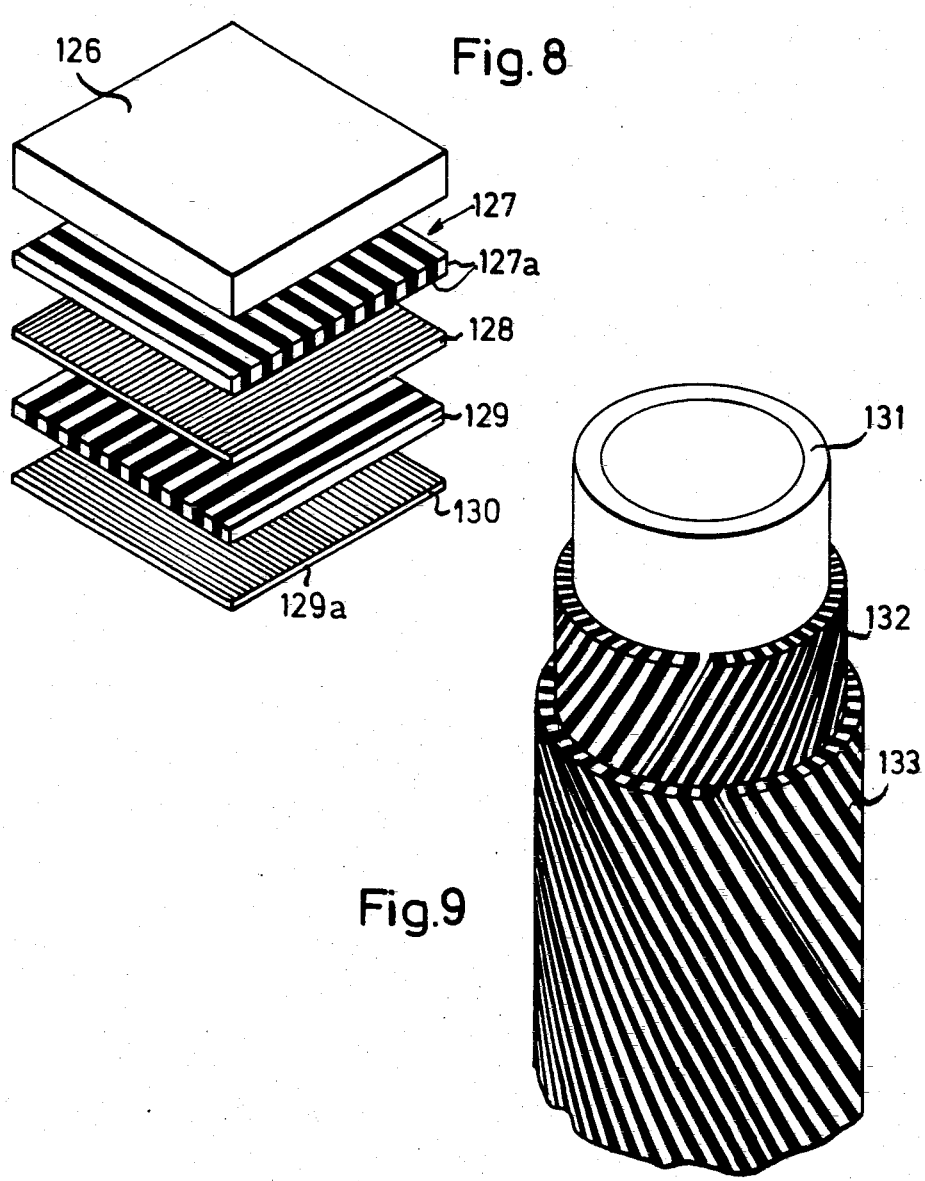

IMAGING ARRANGEMENT FOR SCANNING USING STATIONARY OPTICS

FIELD OF THE INVENTION

This invention relates to an imaging system of the type including a linear, photosensitive detector which is scanned in one dimension.

BACKGROUND OF THE INVENTION

Imaging systems of this type are known as "line cameras" and are particularly used for inspection tasks in the industrial manufacturing field. They include a unidimensional detector array on which the objects are imaged by means of a conventional lens system. Unidimensional detector arrays are substantially less expensive than bidimensional matrices and are available as a single chip accommodating a relatively large number of individual elements. However, to generate a two-dimensional image, a relative motion between object image and array is necessary, this motion being accomplished either by mechanically moving mirror systems located in the imaging beam path or by a movement of the object itself. These motion cycles limit the maximum achievable image frequencies and thus the usability of these systems. In addition, the equipment necessary for mechanically scanning the image in one direction of the coordinates is costly and voluminous.

In the journal entitled "Optical Spectra", May 1980, pages 51 to 52, an image sensor is described which includes a bidimensional CCD (charge-coupled device) array. More specifically, the sensor includes a photoelectric solid-state matrix of the type known as a capacitive bucket-brigade device having a light-sensitive layer upon which is placed a thin fiber-optic image-conducting plate. The front end of this plate is covered by a still thinner glass plate into which light is coupled laterally via glass fibers for illuminating the object to be imaged.

The sensor is applied directly to the object to be imaged and provides an electronic contact print thereof.

Such a sensor, which dispenses with the need for an optical lens system, possesses certain advantages over conventional imaging systems because it permits a very compact design and may thus be used, for example, for the examination of inaccessible locations of the body or machine parts in the manner of an endoscope or technoscope. Its disadvantages are among others that it uses a bidimensional semiconductor matrix for image conversion. At least at the present time, such components still have a low resolution and are relatively expensive, since the production output of perfect components is rather poor. Also, it is particularly in medical applications that getting electrical supply and signal lines to the object to be examined is problematic.

Therefore, known image sensors used for endoscopy include a bundle of fiber-optic conductors which transmit the image of the object to a conventional tube camera, the image being generated remotely by means of an optical lens system on the end face of the fiber-optic bundle.

SUMMARY OF THE INVENTION

It is an object of the invention to provide a low-cost imaging system of simple configuration which eliminates the need for bidimensional detectors and does not require relative movement between the object and the detector.

The arrangement of the invention includes a first optical system that projects a light source traveling in a first coordinate direction to the object as a sharply defined column; and, a second optical system that images the object on the linear detector in the second coordinate direction perpendicular to the first coordinate direction.

In the imaging system of the invention, the object is scanned in one coordinate by a columnar beam of light which determines the resolution of the image in this first scanning direction. The resolution in the second coordinate direction is taken care of by the detector relative to which neither the object itself nor its image has to be moved. Accordingly, mechanical scanners between the object and the detector are not required. Also, the need for movable parts on the illuminating side is obviated, because unidimensional light-emitting or laser diode arrays may be used as the light source.

Two very different and advantageous embodiments are disclosed for the configuration of the two optical systems on the illuminating side and on the viewing side.

In the first embodiment, the two optical systems utilize cylindrical lenses. In this arrangement, the optical systems include a condenser or objective of spherical configuration and an anamorphotic optical tube. This configuration affords the advantage of enabling the condenser or objective to be made of conventional components utilized, for example, in microscopy which are also exchangeable for components with a modified image scale.

In the second embodiment, the two optical systems use fiber-optic waveguide technology such that the two optical systems are configured as respective, line-like or columnar arrangements of light-conductive channels. The respective arrangements of channels cross over each other in the vicinity directly adjacent to the object. The light conductive properties of the channels are so modified in the area of the crossover that a decoupling of light from the channels of the first optical system occurs in the direction of the object and the light scattered by the object is recoupled into the channels of the second optical system.

An imaging system of this type is highly compact and has dimensions barely larger than the surface to be imaged. For the input and output of the optical image signals, only m+n light-conductive channels are required when resolving the object into (m·n) image points. In contrast, conventional light conductors require a number of (n·m) individual fibers. Thus, a reduction by the factor (n·m)/(n+m) is obtained in the cross-section of the fiber bundle transmitting the signal, that is, by a factor of more than one hundred (100) when assuming image points of the order of several hundred per coordinate as the usual values for the resolution of the image to be transmitted.

It is advantageous to use two layers of glass fibers that overlap each other in crosswise fashion for the part of the two optical systems immediately adjacent to the object, that is, the actual sensor, which is placed on the object. In this case, the sensor and the bundle of fibers used for signal transmission are integrally formed as one piece thereby avoiding coupling problems between sensor and signal line.

To decouple and recouple the light in the direction perpendicular to the longitudinal axis of the fiber, the fiber casing in the area of the crossover is removed at the side of the fiber facing the object, with, for example, diffraction gratings being arranged on the fiber cores. This enables the light to be coupled in and out at a high efficiency.

It may also be suitable to dope the fiber cores with scattering material, for example, the structural portion thereof utilized for illumination. This structural portion is doped in the image pickup area whereat the fibers cross over. In this case, the scattering of the light rays caused thereby in the area of the object are emitted at an angular distribution determined by the fiber characteristics.

As an alternative to the configuration of the sensor made up of individual fibers, the light-conductive channels as well as the elements for coupling and decoupling such as phase gratings can be arranged on a substrate in the form of an integrated optical system. While this alternative offers manufacturing advantages in the production of miniaturized image sensors, it may require additional bonding between the sensor and a preferably flexible bundle of light conductors.

To convert the image information present on the light conductive channels of the receiver structure into an electrical (video) signal, commercially available unidimensional detector diode arrays or so-called CCD (charge-coupled device) arrays may be used having individual elements to which the channels are coupled. On the illuminating side, luminescent or laser diode arrays are preferably used; in this arrangement, it may also be suitable to couple several arrays having different emission wavelengths to the corresponding light conductors to obtain a color image. In this regard, the following two possibilities exist:

(a) to concentrate the light emanating from each of the elements of the various arrays (for example luminescent diode arrays) in a fiber or channel ahead of the actual image sensor; or, (b) to provide several parallel substructures or groups of fibers for the desired spectral regions in the area of the image sensor on the illuminating side. In this case, the colors are mixed in the plane of the object.

Instead of an "active" array for the sequential columnar illumination of the object, it is also possible to use a "passive" array of electro-optical control elements which switch in the channels to the light source in time to the scanning frequency, the channels receiving their light from a common light source.

BRIEF DESCRIPTION OF THE DRAWING

The invention will now be described with reference to drawing wherein:

FIG. 1 is a schematic depicting the scanning principle of the invention;

FIG. 2 is a schematic of one embodiment of the invention in a first cutting plane;

FIG. 3 is a schematic of the embodiment of FIG. 1 in a second cutting plane perpendicular to the first cutting plane;

FIG. 4 is a schematic plan view, partially in section, of another embodiment of the invention;

FIG. 5 is a section view taken along the line V—V of FIG. 4;

FIG. 6 is another section view taken along the line VI—VI of FIG. 4;

FIG. 7 is a section view of a third embodiment of the invention;

FIG. 8 is a perspective exploded view of a fourth embodiment of the invention; and, FIG. 9 is a perspective schematic of a fifth embodiment of the invention.

DESCRIPTION OF THE PREFERRED EMBODIMENTS OF THE INVENTION

Referring now to FIG. 1, reference numeral 1 identifies a laser diode array the individual elements of which are sequentially excited by an electronic drive system 2, resulting in a light spot traveling along a direction designated by x. A lens system not illustrated herein in greater detail distorts the light-emitting areas of the diode array 1 by expansion in the direction y so that they become columnar luminous spots 4 used for scanning the object 5 in the object plane 3.

Another lens system (not shown) compresses the object plane 3 in direction x and images it on a detector array 7 which is arranged parallel to column 4 and which scans the object 5 in direction y. Detector array 7 is driven by a second electronic system 6.

The scanning frequency of the laser diode array 1 is lower than the scanning frequency of the detector array 7 by a factor resulting from the number of its individual elements.

A first embodiment of the two optical systems for illuminating and observing the object plane is sketched in FIGS. 2 and 3 wherein the object plane is shown in section. The section views of FIGS. 2 and 3 are in respective planes perpendicular to each other.

Referring to FIG. 2, a condenser 14 configured as a spherical lens assembly and a cylindrical lens 12 are used for imaging the laser diode array 11 into the object plane 15 in the longitudinal direction x of the array 11. The cylindrical axis of the cylindrical lens 12 is disposed so as to be perpendicular to the longitudinal direction x of the array 11.

Widening the light-emitting surfaces of the array 11 in the direction y perpendicular thereto is accomplished by a cylindrical lens 13 having its cylindrical axis normal to the axis of the lens 12. The cylindrical lens 13 images the elements of the array 11 into the rear focal plane of the condenser 14 so as to be distorted as shown in FIG. 3.

The cylindrical lens 13 is configured as a double lens to reduce the influence of the angle-dependent luminance distribution of the elements of array 11 on the homogeneity of the illumination of the object plane 15 in scan direction y.

Object plane 15 is imaged on the detector array 17 in scan direction by a purely spherical lens system made up of an objective 16 and a tube lens 18 (FIG. 3). In the direction perpendicular thereto, the diameter of the bundle of light rays emanating from the object plane 15 has to be compressed to the width of the detector array 17. This is achieved using an optical system made up of two cylindrical lenses 19, 20 which, in addition to the spherical tube lens 18, are located in the beam path between the objective 16 and the array 17 and have no effect on imaging in scan direction.

It is by no means necessary to perform this compression in the order of magnitude of the elements of the detector array 17, that is, at a ratio of approximately 1000 to 1. Detector arrays are commercially available and the elements thereof are already of rectangular form with a side ratio of 100 to 1 as, for example, a detector RL 1024 S of the Retikon Company, a corporation doing business in the U.S.A. When such arrays are used, the cylindrical lenses need compress the light beam only by approximately a factor of 10.

Nor is it necessary to have a sharp and distortion-free image of the illuminated bands in direction x, because resolution of the image in this coordinate is performed by the illuminating optic. In the embodiment illustrated in FIG. 2, lenses 18 to 20 image the rear focal plane of the objective 16 on the detector 17.

The imaging system for transillumination illustrated in FIGS. 2 and 3 may be readily modified for direct illumination by arranging a beam splitter rearward of the objective 16 which then assumes the additional function of the condenser 14.

It is to be understood further that objective and condenser having other imaging scales may be substituted.

The imaging system of FIGS. 4 to 6 employs fiber-optical waveguide technology including two layers 102 and 104 of adjacent glass fibers which are secured to a carrier 111 and overlap in crosswise fashion in the region identified by reference numeral 108. In region 108, the fiber layers 102 and 104 have one side removed to a depth extending into the light-conductive core 106 of the fibers.

Fiber layer 104 conducts the illuminating light that is coupled into the end faces of fiber layer 104 from a light-emitting diode line 101. In this arrangement, each fiber is assigned to one light-emitting diode, for example, fiber 105 is assigned light-emitting diode 103. The end faces of the row of fibers 104 remote from light-emitting diode line 101 are provided with a reflecting layer 109.

To decouple the light from the fibers of layer 104, a diffraction grating 113 is used which is applied directly to the exposed fiber cores of layer 104 (FIG. 5) such that the grating lines thereof are perpendicular to the longitudinal axis of the fiber. The grating constant of grating 113 is so selected that the light is decoupled in the direction of the object 115 located below the grating 113 as effectively as possible, in dependence upon the angular distribution of the light rays conducted in the core of the fibers.

The object 115 to be imaged, to which the sensor is directly applied as shown, is thus illuminated by a columnar light beam having a width corresponding approximately to the diameter of a fiber core 106. The sensor includes a glass plate 114 which closes off the lower side thereof and protects the grating 113. On sequential excitation of the individual elements of the LED line 101 by a suitable commercially available electronic drive system at a frequency $f_1$, successive fibers of layer 104 are illuminated so that the light column impinging on the object travels across the object 115 in a direction perpendicular to the longitudinal axis of the light column.

The light reflected or scattered back by the object 115 passes through the transparent plate 114, the grating 113 and the fiber layer 104 and then enters the "receiving end" of the sensor. The receiving end has the same configuration as the "transmitting end" of the sensor and includes a diffraction grating 112 and a fiber layer 102 arranged above the latter.

The coupling of light into and out of an optical waveguide by means of diffraction gratings is known per se and is described, for example, in German Pat. Nos. 2,142,263, 2,552,118 and in U.S. Pat. No. 4,156,206. The path of a bundle of light rays $S_1$ and $S_2$ from the fiber layer 104 to the object 115 and back into the fiber layer 102 is represented in FIGS. 5 and 6 by way of example.

The light conducted away from the sensor in the fibers of layer 102 is transmitted to a unidimensional CCD (charge-coupled device) array 107 which emits an electrical signal proportional to the intensity of the light incident on its individual elements. The array 107 is scanned at a frequency $f_2$ which is higher compared to frequency $f_1$ of the LED line 101. The frequency $f_2$ has at least the magnitude given by $f_2 = n \cdot f_1$ where n is the number of elements of the CCD array 107.

At the output of the electronic drive unit (not shown) of array 107, a video signal is provided containing the image information of the surface of the object 115 covered by the sensor in the area whereat the fibers overlap. This video signal may be fed directly to a conventional monitor providing a black and white image of the object 115 by adapting the scanning frequencies $f_1$ and $f_2$ to the usual standards of television image representation.

FIG. 7 illustrates an embodiment of the above-described imaging system that is slightly modified for light-transmitting objects. The illustration of FIG. 7 is limited to the section in the plane in which FIG. 5 is drawn.

The light-transmitting sensor is configured in two parts. The upper part includes a carrier 116 supporting the light-conducting fiber layer 124. As in the previous embodiment, a grating 119 to decouple the light is placed on the fiber cores in the area of the sensor whereat a portion of the fiber jackets has been removed. A protective glass plate 123 is provided beneath the grating 119. The front end faces of the fibers are covered by a reflective layer 118.

Apart from a different grating constant of the diffraction grating 120 placed on the fiber layer 122, the lower, light-receiving part of the sensor has the same configuration as the upper, illuminating part of the sensor; however, the lower part is disposed at an angle of 90 degrees relative to the upper sensor part. Interposed between the two parts of the sensor is the thin light-transmitting object 125, which may be a microfilm, for example. An LED line and a CCD array are again coupled to the respective ends of fiber layers 124 and 122. The image is generated in the same manner as described in the embodiments referred to above.

Components in the form of integrated optical systems can be used in lieu of the discrete individual fibers for the light-conductive channels of the sensor. As shown in FIG. 8, the sensor illustrated therein includes a substrate 126 having a low refractive index and upon which a transparent layer 127 of a higher refractive material is placed. Incorporated into the layer 127 are several parallel channels 127a having a modified, higher refractive index, which may be obtained, for example, pursuant to the method described in Applied Optics, Volume 17, No. 4, (1978), pages 646 to 650. These channels 127a correspond to the cores 106 of the fiber layer 104 of the sensor of FIGS. 4 to 6 and serve to guide the light across the surface covered by the sensor.

On the layer 127 there is a diffraction grating 128 to decouple the light, for example, a holographically generated transmission-phase grating. Another layer 129 is disposed next to grating 128 and has the same structure as layer 127, but again disposed is at an angle of 90 degrees relative to layer 127. A second grating 130 facing the object is the last component of the sensor.

Layers 127 and 129 may be made of an elastic polymer and, when adapted to extend out of the region of the sensor, the layers can serve as direct light conductive links between the sensor and the CCD array and the LED line, respectively.

The sensor shown in FIG. 9 is of cylindrical configuration. The layers already described with reference to FIG. 8 are provided on the inner tubular carrier 131 and are twisted in opposite directions. For the sake of simplicity, only the light-conductive layers 132 and 133 are illustrated, with the gratings used for coupling in and out omitted.

This sensor is particularly suited for endoscopy because it permits imaging the full periphery (an image angle of 360 degrees) of the surface of an elastic body canal resting against the sensor. The entire interior of the hollow carrier 131 is available for the passage of microsurgical instruments and to accommodate channels for purging.

It is understood that the foregoing description is that of the preferred embodiments of the invention and that various changes and modifications may be made thereto without departing from the spirit and scope of the invention as defined in the appended claims.

What is claimed is:

1. An imaging arrangement for illuminating and scanning an object and transmitting an image thereof, the imaging arrangement comprising:
   a plurality of stationary individual light sources disposed one next to the other;
   drive means for sequentially exciting said light sources for generating a travelling light spot moving in a first coordinate direction;
   a stationary first optical system for transforming said travelling light spot into a travelling light band and projecting the same onto the object, said light band extending in a direction perpendicularly to said first coordinate direction;
   a stationary linear detector array arranged so as to also extend in a direction perpendicularly to said first coordinate direction; and,
   a stationary second optical system for imaging the entire region of the object scanned by said light band onto said detector array in a second coordinate direction perpendicular to said first coordinate direction.

2. The imaging arrangement of claim 1, said first optical system comprising mutually adjacent cylinder lenses and said second optical system likewise comprising mutually adjacent cylinder lenses.

3. The imaging arrangement of claim 2, said mutually adjacent cylinder lenses of said first optical system conjointly defining anamorphotic tube optic means and said mutually adjacent cylinder lenses of said second optical system likewise conjointly defining anamorphotic tube optic means; said first optical system further comprising spherical condensor means disposed adjacent said anamorphotic tube optic means thereof; and, said second optical system likewise further comprising: spherical condensor means adjacent said anamorphotic tube optic means thereof.

4. The imaging arrangement of claim 1, said first optical system including a first plurality of light-conductive, line-like channel means;
   said second optical system including a second plurality of light-conductive, line-like channel means overlapping said first plurality of channel means in crosswise fashion to conjointly define therewith a sensor placeable directly adjacent the object; and,
   said sensor including: first coupling means for coupling the light from said light source means out of said first plurality of channel means and directing the same onto the object; and, second coupling means for coupling the light scattered from the object into said second plurality of channel means for transmission to said detector array.

5. The imaging arrangement of claim 4, said first plurality of channel means and said second plurality of channel means each being configured as an integrated optical unit formed on substrate means; and, said first coupling means and said second coupling means each likewise being configured as an integrated optical unit formed on substrate means.

6. The imaging arrangement of claim 4, said first and second pluralities of channel means being respective layers of mutually adjacent optic fibers.

7. The imaging arrangement of claim 6, each of said optic fibers having a casing surrounding and defining the core of the fibers; said first and second coupling means including a configuration of said optic fibers wherein a portion of the casing of each of said fibers is removed where said first and said second layers overlap thereby exposing said cores thereof.

8. The imaging arrangement of claim 7, said first coupling means including a first diffraction grating for coupling the light out of said first plurality of optic fibers whereat the respective cores thereof are exposed and directing the same onto the object; said second coupling means including a second diffraction grating for coupling the light scattered from the object into said second plurality of optic fibers whereat the respective cores thereof are exposed for transmission to said detector means, said first and second diffraction gratings being arranged in the region whereat said first and second layers overlap each other.

9. The imaging arrangement of claim 4, at least one of said pluralities of channel means containing a light scattering material.

10. The imaging arrangement of claim 4, said first plurality of channel means being in direct contact with said second plurality of channel means at the region where they overlap each other.

11. The imaging arrangement of claim 1, said light sources being an array of luminescent diodes and said detector array being an array of detector diodes.

12. The imaging arrangement of claim 1, said light sources being an array of laser diodes and said detector array being an array of charge-coupled detectors.

13. The imaging arrangement of claim 4, said light sources and the elements of said detector array being optically connected to said sensor via respective sets of flexible light conductors.

* * * * *